United States Patent [19]
Togami et al.

[11] Patent Number: 5,881,542
[45] Date of Patent: Mar. 16, 1999

[54] NARROW ROW CORN HEAD WITH STAGGERED HEIGHT ROW UNITS

[75] Inventors: Paul G. Togami, Wheaton; Joachim Horsch, Lombard, both of Ill.

[73] Assignee: Case Corporation, Racine, Wash.

[21] Appl. No.: 911,554

[22] Filed: Aug. 14, 1997

[51] Int. Cl.$^6$ .......................... A01D 45/02; A01D 57/22
[52] U.S. Cl. .......................... 56/98; 56/82; 56/88; 56/111
[58] Field of Search .................... 56/66, 119, 59, 56/75, 78, 82, 88, 93, 98, 106, 108, 111

[56] References Cited

U.S. PATENT DOCUMENTS

| | | |
|---|---|---|
| Re. 31,063 | 10/1982 | Greiner et al. . |
| Re. 31,064 | 10/1982 | Shriver . |
| 1,586,069 | 5/1926 | Clark et al. . |
| 2,379,822 | 7/1945 | Mitchell et al. . |
| 2,491,195 | 12/1949 | Messenger et al. . |
| 2,527,786 | 10/1950 | Barkstrom . |
| 2,826,031 | 3/1958 | Hansen . |
| 2,961,820 | 11/1960 | Hadley . |
| 3,352,093 | 11/1967 | Procter . |
| 3,496,708 | 2/1970 | Bornzin . |
| 3,528,233 | 9/1970 | Martner et al. . |
| 3,528,234 | 9/1970 | Kowalik et al. . |
| 3,670,482 | 6/1972 | Blanshine et al. . |
| 3,759,021 | 9/1973 | Schreiner et al. . |
| 3,808,783 | 5/1974 | Russell et al. . |
| 3,818,685 | 6/1974 | Stoessel et al. . |
| 3,854,272 | 12/1974 | Lane, III et al. . |
| 3,894,382 | 7/1975 | Jauss . |
| 3,940,913 | 3/1976 | Wallenfang et al. . |
| 3,982,384 | 9/1976 | Rohweder et al. . |
| 4,009,557 | 3/1977 | Reicks . |
| 4,106,270 | 8/1978 | Weigand et al. . |
| 4,227,368 | 10/1980 | Mossman et al. . |
| 4,244,161 | 1/1981 | Guiter ..................................... 56/98 X |
| 4,259,831 | 4/1981 | Jerke et al. ............................ 56/119 X |
| 4,269,017 | 5/1981 | deBuhr et al. . |
| 4,327,542 | 5/1982 | Van Ginhoven . |
| 4,333,304 | 6/1982 | Greiner et al. . |
| 4,493,181 | 1/1985 | Glendenning et al. . |
| 4,531,351 | 7/1985 | Sousek . |
| 4,598,535 | 7/1986 | Sousek . |
| 4,771,592 | 9/1988 | Krone et al. . |
| 4,805,388 | 2/1989 | Kell . |
| 5,060,464 | 10/1991 | Caron . |
| 5,528,887 | 6/1996 | Nagy et al. . |

OTHER PUBLICATIONS

*Farm Show,* vol. 20, No. 5, 1996—"Build–It–Yourself" Narrow Row Header Kit.
*Farm Industry News,* vol. 29, No. 11, 1996—"Does Narrow Row Corn Add Up?".
*Ontario Farmer,* vol. 29, No. 40, 1996—"Thinking 15–Inch".
1000 Series Corn Head, Operators Manual, 1995 Case Corporation.
1000 Series Corn Head, Parts Catalog, 1993 Case Corporation.
Allis–Chalmers Trector Division–Milwaukee, U.S.A., "1918–1960, An Informal History", Copyright 1989 by Alan C. King.
Operators Manual, Setting Up Instructions, "McCormick 34HM–21 Corn Snapper (Two Row, Mounted Type)", International Harvester Company (Date Unknown).
Instruction Manual and Parts List, "Snapping Unit Frame Field Improvement Parts for McCormick–Deering, No. 14P, No. 24, Corn Pickers", International Harvester Company (Date Uknown).
CP–8 McCormick Parts Catalog, "34HM–20 Corn Picker, 34HM–21 Corn Snapper, 34HM–22 Sweet Corn Picker (Two Row, Mounted–Type)", International Harvester (Date Unknown).

*Primary Examiner*—Terry Lee Melius
*Attorney, Agent, or Firm*—Foley & lardner

[57] ABSTRACT

The row crop header for a harvesting machine includes a frame and a first row unit supported by the frame in a row unit plane. The first row unit includes a first gatherer operating in a first gatherer plane oblique to the row unit plane and a second gatherer operating in a second gatherer plane parallel to the first gatherer plane and oblique to the row unit plane.

18 Claims, 5 Drawing Sheets

NARROW ROW CORN HEAD WITH STAGGERED HEIGHT ROW UNITS

FIELD OF THE INVENTION

This invention relates to a row crop harvesting machine. More particularly, this invention relates to a header for a row crop harvesting machine that is designed to harvest crops, such as corn, planted in rows spaced closer together than in the past.

BACKGROUND OF THE INVENTION

Several variations of header units have been used in combines or harvesting machines for harvesting row crops such as corn and cotton. One of the first such header units was a corn head with fixed spacing between the row units. Several other corn heads allowing variable spacing between the row units were then developed.

With the advent of the variable row width header units, the last several years has seen a rapid increase in the research and development of the effect of varying row widths on the growth of corn and other row crops. The existing corn heads and harvesting machines are designed to efficiently harvest corn planted in rows having a row width of greater than 20 inches, because the existing corn heads have the gatherers of their row units in the same plane, thereby limiting how close the row units can be arranged together.

For example, a typical existing corn head with a plurality of row units has both the gatherers of each row unit positioned in the same plane. Thus, the adjacent gatherers of any two adjacent row units are also positioned in the same plane. This limits how close the adjacent row units can be positioned as the adjacent gatherers of the adjacent row units interfere with each other if the adjacent row units are positioned too close to each other. As the technology to build the chains and gears required for efficient operation limits the minimum width of a row unit, the positioning of adjacent row units determines the minimum crop row width that can be efficiently harvested by the existing corn heads. Thus, current technology limits the row widths to about 20 inches because the gatherers in adjacent row units of the existing corn heads interfere with each other if they are brought any closer.

Recent research on the spacing of the corn rows has indicated special benefits for narrower row spacings that are 12–15 inches apart. In addition to the obvious increase in yield and crop population, these benefits include improved erosion control and better weed control. The narrower rows also require less chemicals and pesticides per unit of yield thereby benefiting the environment.

Existing header units are not designed to harvest rows having a spacing of 15 inches or less. Consequently, they are very wasteful and inefficient in harvesting narrow rows leading to a sub-optimal harvesting efficiency.

The problems identified above are not intended to be exhaustive but are among the many that reduce the effectiveness of current solutions to the problem of harvesting crops planted in narrow rows. Other problems may also exist; however, those presented above should be sufficient to demonstrate that currently known solutions are amenable to worthwhile improvement.

SUMMARY OF THE INVENTION

The present invention is directed to an improved row crop header for a harvesting machine. The row crop header includes a frame and a first row unit supported by the frame in a row unit plane. The first row unit includes a first gatherer operating a first gatherer plane oblique to the row unit plane and a second gatherer operating in a second gatherer plane parallel to the first gatherer plane and oblique to the row unit plane.

The present invention provides a row crop header with a plurality of row units mounted on a frame of the row crop header. The plurality of row units includes a first row unit positioned in a first plane and an adjacent second row unit positioned in a second plane. The first plane and the second plane are offset. This configuration allows the two adjacent row units to be positioned closer together because they overlap along an axis that is substantially parallel to both the first plane and the second plane. This overlap determines how close the adjacent row units are positioned together. Therefore, increasing the overlap reduces the distance between the adjacent row units.

The present invention also provides a method that provides a row crop header including a first row unit positioned in a first plane and a second row unit positioned in a second plane where the first plane and the second plane are offset and the first row unit is adjacent to the second row unit. The first row unit and second row unit are connected to the frame of the row crop header with the first row unit overlapping the second row unit along an axis that is substantially parallel to both the first plane and the second plane. This overlap permits the row crop header of the present invention to efficiently harvest narrower crop rows when the row crop header is mounted on a harvesting machine.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Figure 1:
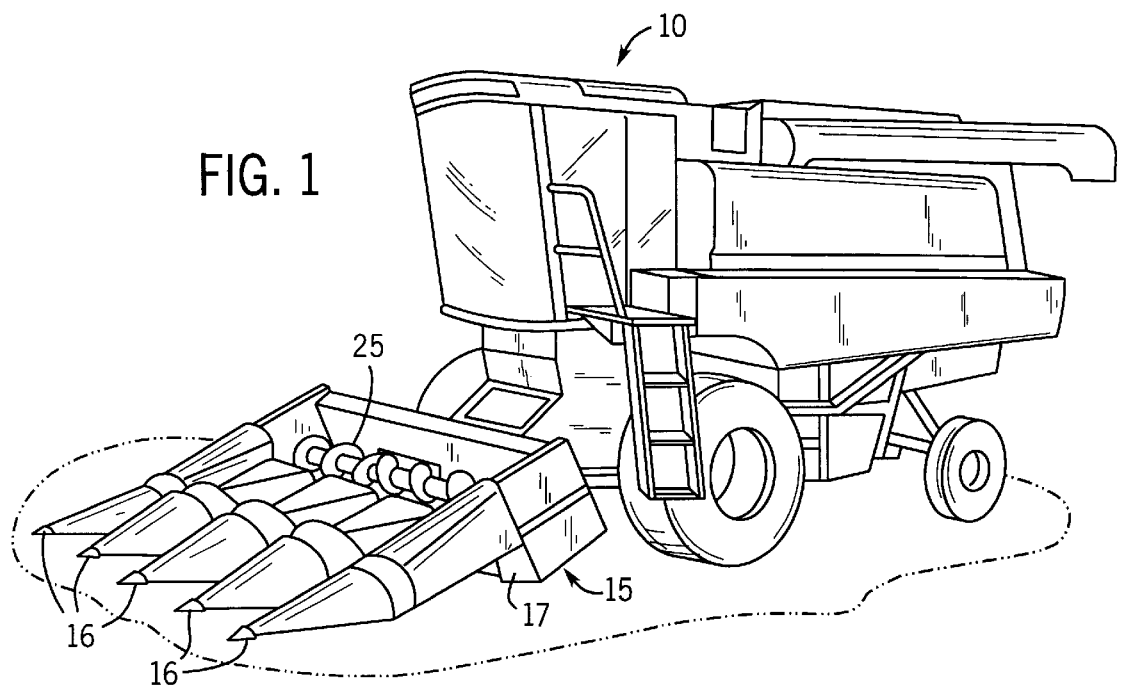
FIG. 1 is a perspective view of a harvesting combine with an attached row crop header provided by the invention.

In the figures, like numerals indicate like parts. FIG. 1 shows an improved row crop header, indicated generally as 15, connected to a combine or harvesting machine 10. The improved row crop header 15 has a unique configuration that permits the efficient harvesting of the crops planted in rows spaced closer together than in the past.

Figure 2:
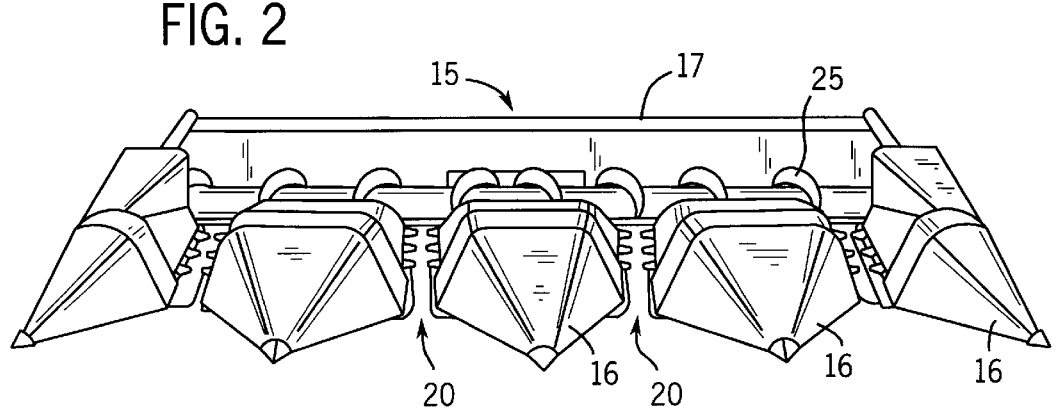
FIG. 2 is a perspective front view of the row crop header shown in FIG. 1.

FIG. 2 shows the row crop header 15 having a plurality of row units 20 connected to a frame 17 of the row crop header 15. The row units 20 are covered by a plurality of housings 16.

Figure 3:
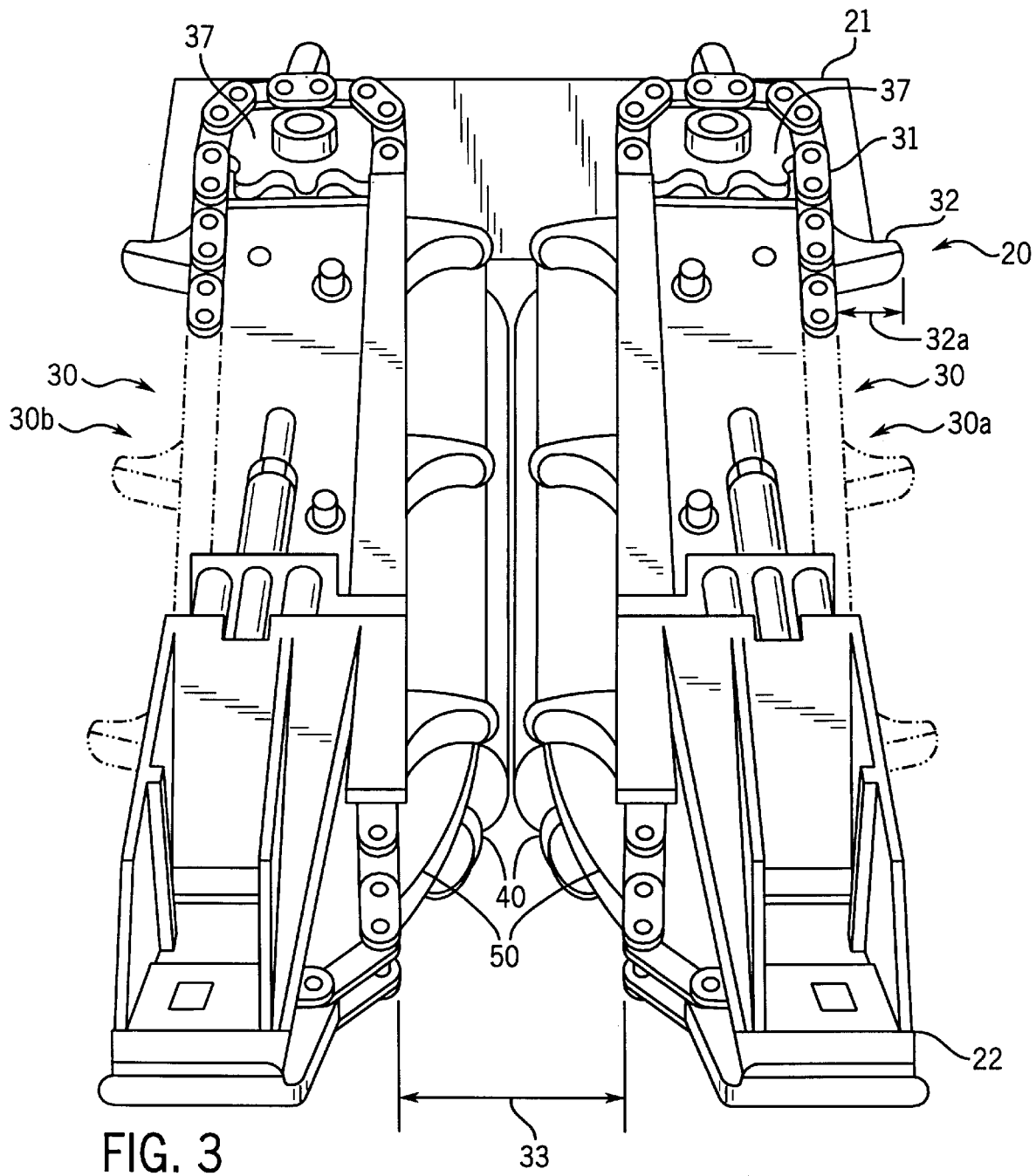
FIG. 3 is a perspective view of a row unit of the row crop header shown in FIGS. 1 and 2.

As shown in FIG. 3, each row unit 20 has a frame end 21 and a head end 22. The frame end 21 of the row unit 20 attaches to the frame 17, while the head end 22 serves as the longitudinal extension of the row unit 20 and as a crop engagement device. That is, the row unit 20 extends forward from the frame end 21 to the head end 22.

Each row unit 20 also has at least one gatherer 30. The preferred embodiment of the row crop header 15, has two gatherers 30. Each gatherer 30 includes a gathering chain 31 with at least one sprocket 37. A plurality of fingers 32 are connected to and extend outward from the gathering chain 31. The fingers 32 are protuberances having at least one surface adapted to contact and move corn ears or other harvested crop. The gathering chain 31 traverses a substantially oval path and extends forward from proximate the frame end 21 to proximate the head end 22 of the row unit 20.

Note that other embodiments of the gatherer 30 are possible, including but not limited to belts, ropes or other conveying mechanisms. These other conveying mechanisms can include, for example, an auger, a conveyor or any other mechanism that is suitable for moving corn ears or other crops.

A pair of snapping rolls 40 pull the corn stalks so that the corn ears are removed from the stalks when they come into contact with a pair of stripper plates 50. The ears are then carried backwards by the fingers 32 of gathering chain 31 to a conveying mechanism, such as a cross auger 25, which is seen in FIGS. 1 & 2. The auger 25 moves the ears to a grain housing or collection device (not shown) of the harvesting machine 10 on which the row crop header 15 is mounted.

In the preferred embodiment, as shown in FIG. 3, each row unit 20 has two gathering chains 31 that are spaced apart by a distance 33 that is at least twice the width 32a of the fingers 32 of the gathering chains 31. Likewise, the minimum width of the gathering chain 31 is limited by the current technology to permit efficient operation of the row units. The spacing distance 33 and the width of the gathering chains 31 limit the minimum width of the row units 20.

Figure 4:
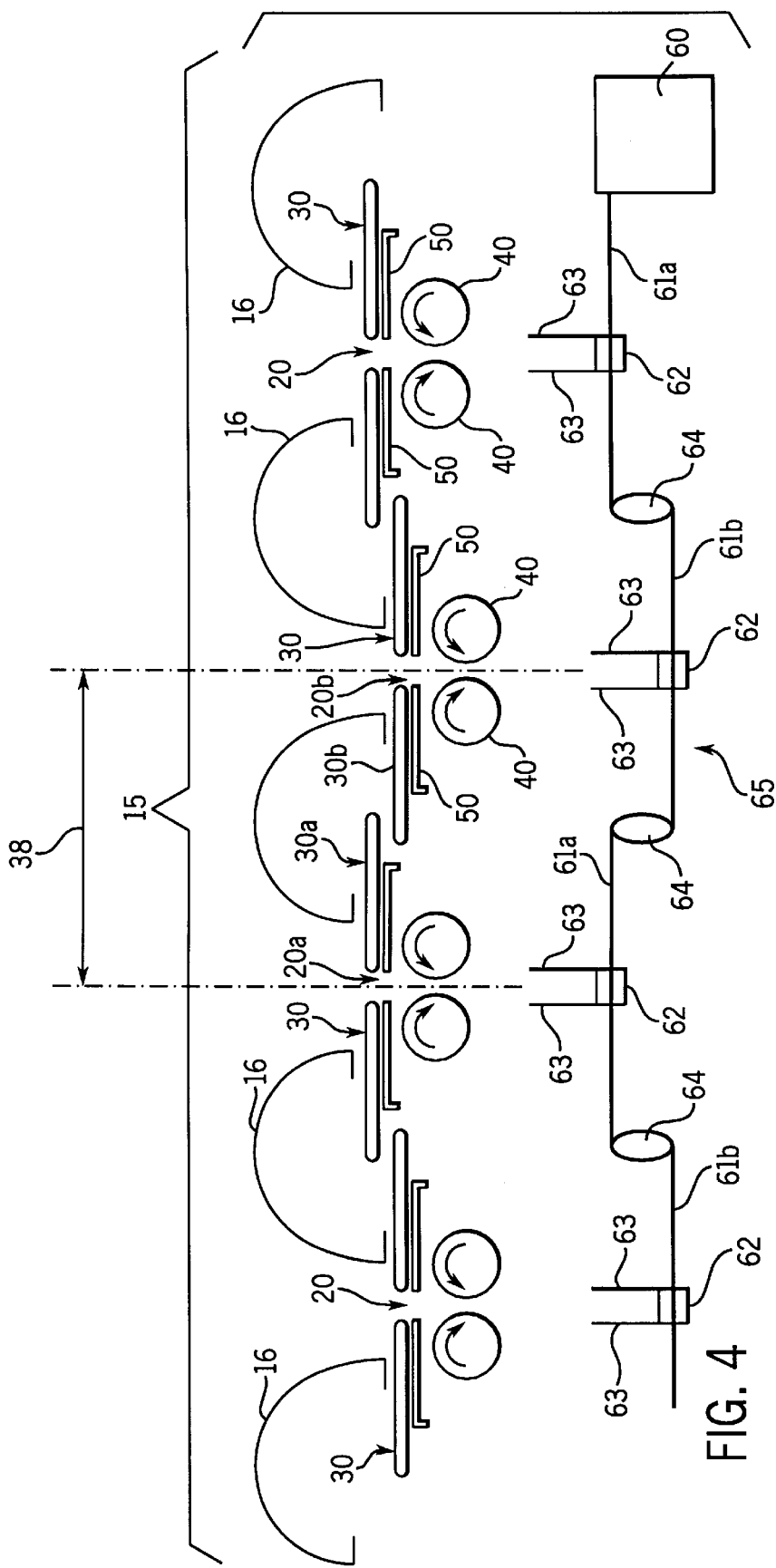
FIG. 4 is a schematic front view of the row crop header showing a plurality of row units, with the adjacent row units positioned in offset planes.
Figure 5:
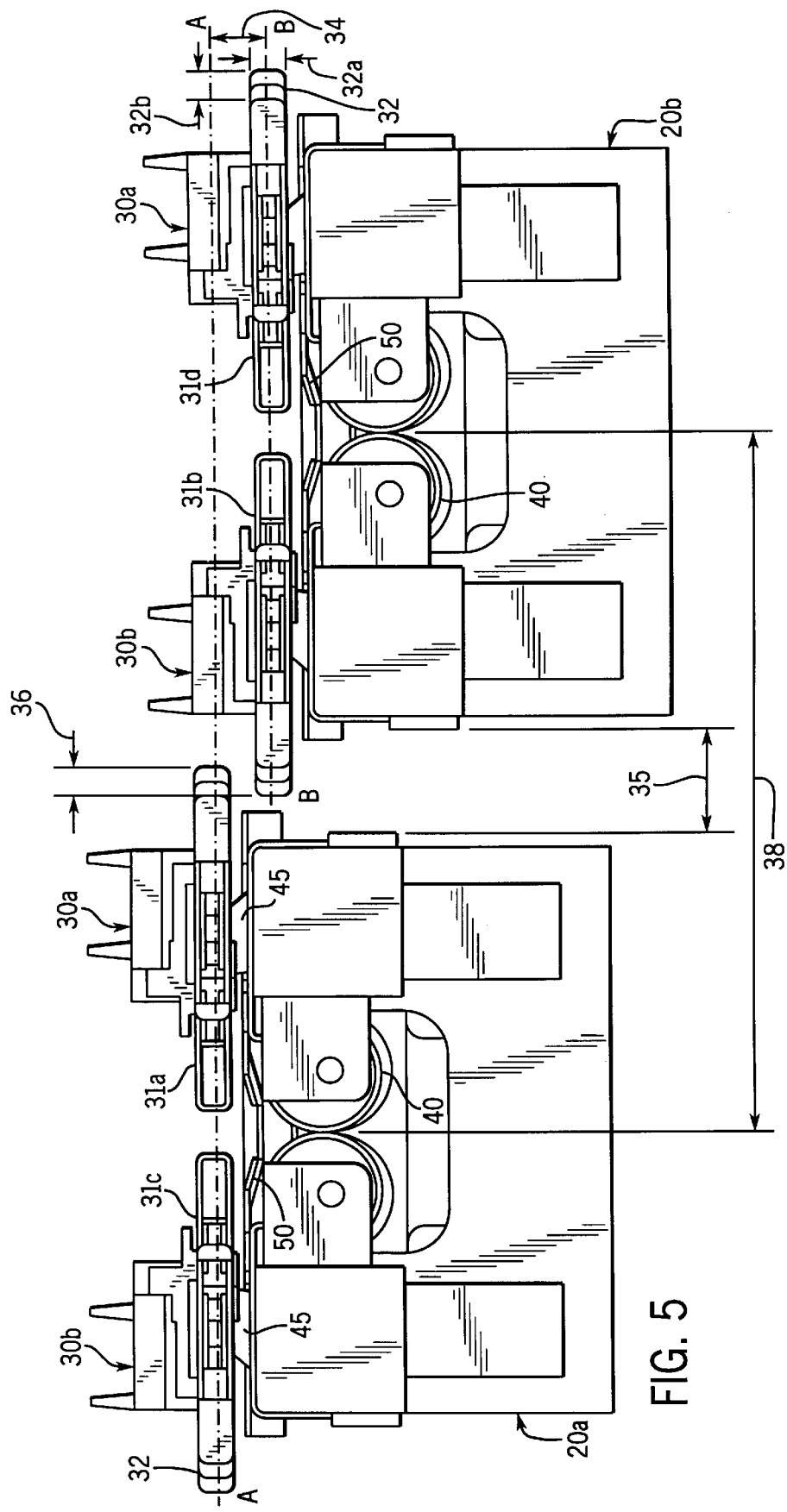
FIG. 5 is a detailed front view of a pair of the adjacent row units of the row crop header shown in FIGS. 1, 2 and 4.

FIGS. 4 & 5 show the unique configuration of the row units 20 of row crop header 15. FIG. 4 is a schematic front view of a plurality of row units 20 of the preferred embodiment of the row crop header 15. Each of the plurality of row units 20 is connected to the frame of the row crop header 15 with a housing 16 covering the adjacent gatherers 30 of two adjacent row units 20. The housing 16 also serves as guides for the corn stalks as the row crop header is moved forward by the harvesting machine 10, shown in FIG. 1.

It is to be understood that "adjacent" row units refer to two row units 20, such as row unit 20a and row unit 20b, that are placed next to each other along the frame although structural members or other elements could be interposed between the two adjacent row units 20. Thus, row unit 20a is adjacent to row unit 20b as long as no other row unit 20 is positioned between them even though other structural members or elements may be interposed between them.

Each row unit 20 of the row crop header 15 is positioned so that it is in an offsetting plane from the row units 20 that are adjacent to it. Thus, as shown in FIG. 5, a first row unit 20a is positioned in a first plane AA. A second row unit 20b, adjacent to the first row unit 20a, is positioned in a second plane BB which is offset 34 from the first plane AA. The offset 34 measures the separation of the two planes AA, BB.

In the preferred embodiment of the row crop header 15, the offset 34 always has a positive value as the two planes AA and BB are distinct and do not coincide. Also, in the preferred embodiment, the two planes AA and BB are substantially parallel to each other and the offset 34 is measured along an axis that is perpendicular to both the first plane AA and the second plane BB.

The offset 34 between the two planes AA, BB can be made adjustable to optimize the effectiveness of the gathering chains 31 in moving the harvested crop backward to the cross auger 25 and thereon to the grain collection device. Such an adjustment mechanism could be provided by having a supporting bracket (not shown) for both the gathering chains 31 of a row unit 20. The supporting bracket could be provided with a plurality of slots so that the gathering chains 31 could be positioned in any of the slots to increase or decrease the offset 34.

As shown in FIG. 5, two adjacent row units, a first row unit 20a and a second row unit 20b are arranged closer together than in the existing corn heads because the adjacent chains 31a, 31b of two adjacent row units 20a, 20b are in the first plane AA and the second plane BB, respectively. The first plane AA and the second plane BB are substantially parallel to each other and spaced by the offset 34. This offset 34 permits the adjacent gathering chains 31a, 31b to overlap 36 along an imaginary axis that is substantially parallel to both the first plane AA and the second plane BB.

The fingers 32 of the adjacent chains 31a, 31b of adjacent row units 20a, 20b overlap as the chain 31a of row unit 20a is offset 34 from the adjacent chain 31b of row unit 2Ob. The overlap 36 permits the distance 35 between two adjacent row units 20a, 20b to be reduced by the amount of the overlap 36. Thus, the overlap 36 allows a closer arrangement of the row units 20 so that the crop row width 38 is less than minimum crop row width achievable in the existing corn heads.

In the preferred embodiment of the row crop header 15, the overlap 36 is approximately 5 inches to permit the reduction of the crop row width 38 to 15 inches. In the preferred embodiment, the offset 34 is approximately 1.5 inches which allows the two adjacent gathering chains 31a, 31b to overlap 36 sufficiently to reduce the crop row width 38 of the row crop header 15. The offset 34 should also preferably be greater than the finger height 32a to ensure that the fingers of adjacent gathering chains, such as 31a and 31b, do not interfere with each other during the operation of the row crop header 15.

The gatherers 30 and the snapping rolls 40 are driven by a power source 60, shown schematically in FIG. 4. In the preferred embodiment, the power source 60 includes a drive shaft 61 with a plurality of gear boxes 62 adapted so that the power outputs from the gear boxes 62 drive the gatherers 30 and the snapping rolls 40. Other embodiments of the power source 60 are also possible, for example, different power sources could be used to drive the snapping rolls 40 and the gatherers 30. Alternatively, a single power source could be used with a plurality of drive shafts and drive means. Such gear boxes 62 and drive means are described in several U.S. Patents and any of them could be easily adapted for use with the row crop header of the present invention. For example, these include the drive means shown in U.S. Pat. No. 3,462,928 issued to L. D. Schreiner and in U.S. Pat. No. 3,599,409 issued to Martin J. Whitney, the disclosures of which are incorporated, in their entirety, by reference.

It is to be understood that the drive mechanism 65 is suitably installed within the row crop header and connected to the row unit components. The drive mechanism 65 is shown schematically in FIG. 4 as being separate for purposes of clarity.

In an alternative embodiment of the drive mechanism 65, a single drive shaft could be provided with gatherer shafts 63 of different lengths to drive the gatherers 30 positioned in the offset planes AA and BB, shown in FIG. 5. that is, longer gatherer shafts 63 would drive the gatherers 30 operating in the upper plane AA while shorter or standard gatherer shafts 63 would drive the gatherers 30 operating in the lower plane BB.

In another alternative embodiment of the drive mechanism 65, two drive shafts can be provided so that each drive shaft drives the row unit components of the row units 20 that are positioned in the same plane. Therefore, the driven components of row unit 20a would be driven by one of the two drive shafts. The driven components of row unit 20b, located in an offset plane from row unit 20a, would be driven by the other of the two drive shafts.

With reference to FIGS. 4 & 5, an improved method is also provided which includes providing a row crop header 15 with two adjacent row units 20a, 20b such that a first row unit 20a is positioned in a first plane AA and a second row unit 20b is positioned in a second plane BB. The first plane AA and the second plane BB are substantially parallel to each other and spaced apart by an offset 34.

The method also provides for attaching the row crop header 15 to a harvesting machine 10, such as the one shown in FIG. 1, and operating the row crop header 15 using a power source 60 to harvest row crops planted in narrower rows than in the past. Note that the preferred embodiment of the row crop header is discussed as operating on rows of corn. However, the instant row crop header could be easily adapted to work with other row crops, such as cotton and sunflower.

Figure 6:
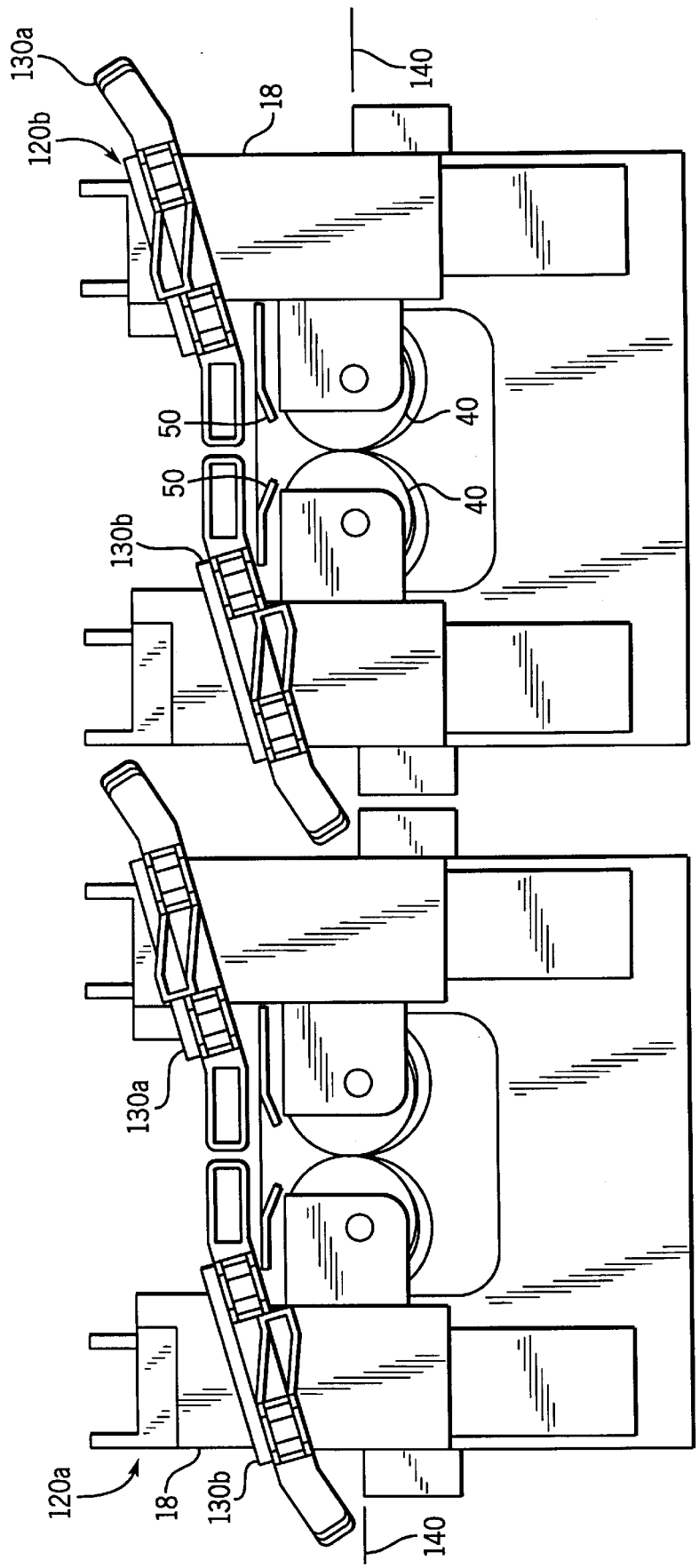
FIG. 6 is a detailed front view of an alternate embodiment of the pair of adjacent row units of the row crop header shown in FIGS. 1, 2 and 4.

FIG. 6 is a detailed front view of row units 120a, 120b, alternate embodiments of row units 20a and 20b shown in FIGS. 1–5. Row units 120a, 120b are similar to row units 20a, 20b except that row units 120a, 120b include gatherers 130a, 130b. For ease of illustration, those remaining elements of row units 120a, 120b which correspond to similar elements of row units 20a, 20b are numbered similarly. Row units 120a, 120b are supported by frame 18 along a row unit plane 140. In the preferred embodiment, row unit plane 140 is generally horizontal. Gatherers 130a, 130b of row units 120a, 120b are similar to gatherers 30a, 30b except that gatherers 130a, 130b operate in gatherer planes which are oblique to row unit plane 140. In the preferred embodiment illustrated, gatherers 130a, 130b of each row unit 120a, 120b operate in gatherer planes substantially parallel to one another and oblique to row unit plane 140. In particular, gatherer 130a of each row unit 120a, 120b operates in a plane downwardly sloped towards stalk rolls 40 and stripper plates 50. Gatherer 130b of each row unit 120a, 120b operates in a gatherer plane downwardly sloped from stalk rolls 40 and stripper plates 50 towards an adjacent row unit. In the preferred embodiment illustrated, gatherers 130a, 130b operate in gatherer planes sloped or angled with respect to row unit plane 140 by approximately 20 degrees. As further shown by FIG. 6, gatherer 130a of each row unit 120a, 120b operates in a gatherer plane parallel to and slightly above the gatherer plane in which gatherer 130b of the same row unit operates. Adjacent gatherers 130a, 130b of adjacent row units 120a, 120b operate in gatherer planes parallel to and offset from one another.

Because gatherers 130a, 130b of each row unit 120a, 120b operate in gatherer planes parallel to one another and oblique to row unit plane 140, gatherers 130a, 130b occupy less space parallel to row unit plane 140. As a result, row units 120a, 120b may be more closely spaced together for better accommodating narrower crop rows. Because adjacent gatherers 130a, 130b of adjacent row units 120a, 120b operate in gatherer planes parallel to one another and oblique to row unit plane 140, adjacent gatherers 130a, 130b of adjacent row units 120a, 120b may be supported so as to overlap one another. Consequently, row units 120a, 120b are additionally positioned even more closer together to better accommodate narrow crop row spacings.

Thus, the instant row crop header 15 permits a closer arrangement of the row units 20, 120 to harvest crop rows that are 15 inches apart or less. Existing corn heads with the row units in substantially the same plane are unable to efficiently harvest rows that are narrower than 20 inches. Therefore, some of the major advantages of the instant row crop header include the unique combination of providing an improved apparatus and method that:

(i) permits the harvesting of narrower crop rows by allowing the row units to be arranged closer together on the row crop header frame;

(ii) benefits the environment by reducing the requirement for chemicals and pesticides per unit of crop harvested; and (iii) improves soil control and erosion by allowing crop rows to be planted closer together.

Other embodiments of the row crop header will be apparent to those skilled in the art from consideration of the specification disclosed herein. It is intended that the specification be considered as exemplary only, with the true scope and spirit of the invention being indicated by the following claims.

What is claimed is:

1. A row crop header for harvesting machine, the row crop header comprising:

a frame; and a first row unit supported by the frame in a row unit plane, the first row unit including:

a first gatherer operating in a first gatherer plane oblique to the row unit plane; and a second gatherer offset vertically form the first gatherer and operating in a second gatherer plane offset and parallel to the first gatherer plane.

2. The row crop header of claim 1 including:

a second row unit supported by the frame adjacent to the first row unit, the second row unit having a third gatherer adjacent the first gatherer, the third gatherer operating in a third gatherer plane parallel to and offset from the first gatherer plane.

3. The row crop header of claim 1 wherein the first row unit includes a plurality of stripper plates extending along the row unit plane.

4. The row crop header of claim 1 wherein the first row unit includes a plurality of stalk rolls extending along the row unit plane.

5. The row crop header of claim 1 wherein the first row unit is supported by the frame in a substantially horizontal row unit plane.

6. The row crop header of claim 1 wherein the first gatherer includes a plurality of conveying fingers reciprocatively driven between a front and a rear of the first row unit.

7. The row crop header of claim 2, wherein the row crop header has a rear end configured for being coupled to the harvesting machine and a front end opposite the rear end and wherein the first gatherer and the third gatherer overlap one another at the front end.

8. The row crop header of claim 7, wherein the first gatherer and the third gatherer have a length extending from the front end towards the rear end and wherein the first gatherer and the third gatherer overlap one another along the entire length.

9. The row crop header of claim 2, wherein the row crop header has a rear end configured for being coupled to the harvesting machine and a front end opposite the rear end and wherein the first and second row units extend parallel to one another from the front end towards the rear end.

10. The row crop header of claim 2, wherein the first gatherer includes a plurality of fingers having a finger height and a finger width and wherein the first gatherer plane and the third gatherer plane are offset by a distance greater than the finger height.

11. The row crop header of claim 1, wherein the first row units include at least one crop separating edge supported in the row unit plane, wherein the crop separating edge is configured to separate crop portions to be harvested from the remaining crop portion.

12. The row crop header of claim 11, wherein the first row unit includes:
    at least one stripper plate supported by the frame proximate the first gatherer to provide said at least one crop separating edge; and
    at least one stalk roll supported by the frame proximate said at least one stripper plate, wherein said at least one stalk roll and said at least one stripper plate cooperate to remove corn ears from corn stalks.

13. A row crop header having a rear end configured for being coupled to a harvesting machine and a front end opposite the rear end, the row crop header comprising:
    a frame;
    a first row unit supported by the frame and including a crop separating mechanism extending within a row unit plane and adapted to separate crop portions to be harvested from remaining crop portions, the first row unit including:
        a first gatherer operating in a first gatherer plane oblique to the row unit plane; and
        a second gatherer operating in a second gatherer plane offset and parallel to the first gatherer plane; and
    a second row unit supported by the frame adjacent to the first row unit, the second row unit having a third gatherer adjacent the first gatherer, the third gatherer overlapping the first gatherer at the front end of the row crop header.

14. The row crop header of claim 13, wherein the first and third gatherers have a length extending from the front end towards the rear end and wherein the first and third gatherers overlap one another along the entire length.

15. The row crop header of claim 13, wherein the first row unit and the second row unit extend parallel to one another from the front end towards the rear end.

16. The row crop header of claim 13, wherein the third gatherer operates in a third gatherer plane parallel to and offset from the first gatherer plane.

17. The row crop header of claim 16, wherein the first gatherer includes a plurality of fingers, each finger having a finger height and a finger width and wherein the first gatherer plane and the third gatherer plane are offset by a distance greater than the finger height.

18. A row crop header having a rear end configured for being coupled to a harvesting machine and a front end opposite the rear end, the row crop header comprising:
    a frame;
    a first row unit supported by the frame and including a crop separating edge extending within a row unit plane, the first row unit including:
        a first gatherer operating in a first gatherer plane oblique to the row unit plane, the first gatherer including a plurality of fingers, each finger having a finger height and a finger width; and
        a second gatherer operating in a second gatherer plane offset and parallel to the first gatherer plane; and
    a second row unit supported by the frame adjacent to the first row unit, the second row unit having a third gatherer adjacent the first gatherer, the third gatherer operating in a third gatherer plane parallel to and offset from the first gatherer plane by a distance greater than the finger height.

* * * * *